US012587101B2

(12) United States Patent
You

(10) Patent No.: US 12,587,101 B2
(45) Date of Patent: Mar. 24, 2026

(54) POWER MANAGEMENT SYSTEM WITH DISTRIBUTED ERROR FEEDBACK

(71) Applicant: Cirrus Logic International Semiconductor Ltd., Edinburgh (GB)

(72) Inventor: Zhong You, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 18/730,943

(22) PCT Filed: Feb. 3, 2023

(86) PCT No.: PCT/US2023/012255
§ 371 (c)(1),
(2) Date: Jul. 22, 2024

(87) PCT Pub. No.: WO2023/154218
PCT Pub. Date: Aug. 17, 2023

(65) Prior Publication Data
US 2025/0105745 A1 Mar. 27, 2025

Related U.S. Application Data

(60) Provisional application No. 63/437,890, filed on Jan. 9, 2023, provisional application No. 63/309,916, filed on Feb. 14, 2022.

(51) Int. Cl.
*H02M 3/16* (2006.01)

(52) U.S. Cl.
CPC .................................... *H02M 3/16* (2013.01)

(58) Field of Classification Search
CPC ........ H02M 3/16; H02M 1/008; H02M 3/156; G05F 1/575; G05F 1/10
See application file for complete search history.

(56) References Cited

U.S. PATENT DOCUMENTS

2011/0074373 A1* 3/2011 Lin ..................... H02M 3/1582
323/282

FOREIGN PATENT DOCUMENTS

CN 112700744 A * 4/2021 ........... G09G 3/3696

OTHER PUBLICATIONS

International Search Report and Written Opinion of the International Searching Authority, International Application No. PCT/US2023/012255, mailed May 24, 2023.
Combined Search and Examination Report under Sections 17 and 18(3), UKIPO, Application No. GB2301669.4, mailed Aug. 8, 2023.
Examination Report under Sections 17 and 18(3), UKIPO, Application No. GB2301669.4, mailed May 22, 2024.

* cited by examiner

*Primary Examiner* — Lincoln D Donovan
*Assistant Examiner* — Amit R Bhatia
(74) *Attorney, Agent, or Firm* — Jackson Walker L.L.P.

(57) ABSTRACT

A power management integrated circuit (PMIC) may have a loop controller configured to receive a first error signal from a first driver IC having a first driver powered from a supply voltage and configured to drive a first output signal responsive to a first input signal and a first error detector configured to generate the first error signal based between the supply voltage as detected locally to the first driver IC and a first reference voltage associated with the first driver, receive a second error signal from a second driver IC analogous to the first driver IC, and regulate the supply voltage based on the first and second error signals.

9 Claims, 1 Drawing Sheet

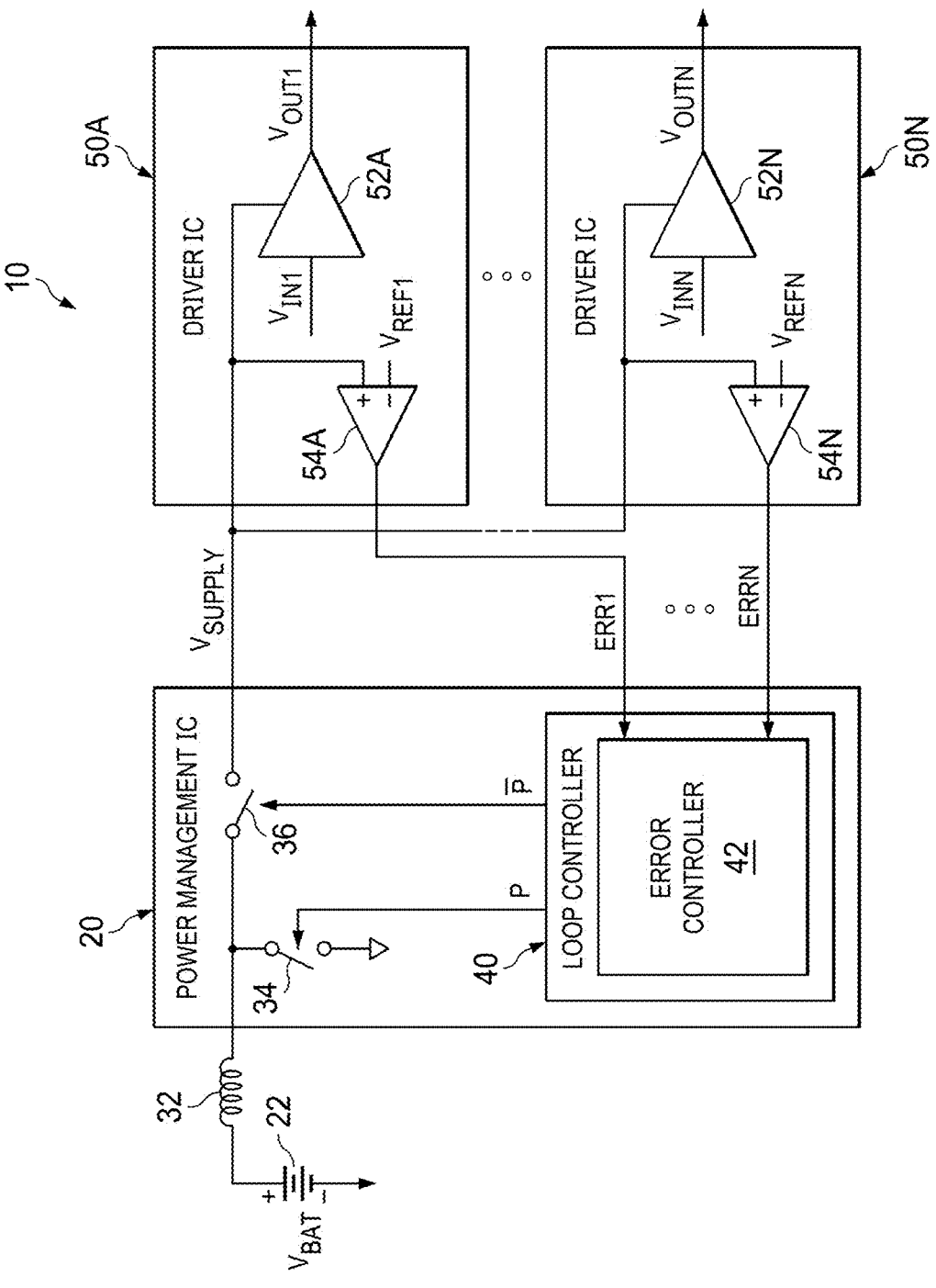

POWER MANAGEMENT SYSTEM WITH DISTRIBUTED ERROR FEEDBACK

The present application is a 371 of International Patent Application No. PCT/US2023/012255, filed Feb. 3, 2023, which claims priority to U.S. Provisional Patent Application Ser. No. 63/309,916, filed Feb. 14, 2022, and U.S. Provisional Patent Application No. 63/437,890, filed Jan. 9, 2023, each of which is incorporated by reference herein in its entirety.

RELATED APPLICATION

The present disclosure is related to U.S. Provisional Patent Application Ser. No. 63/309,916 filed Feb. 14, 2022, which is incorporated by reference herein in its entirety.

FIELD OF DISCLOSURE

The present disclosure relates in general to circuits for electronic devices, including without limitation personal audio devices such as wireless telephones and media players, and more specifically, a power management system for devices in which the power management system implements power supply error feedback within individual devices.

BACKGROUND

Personal audio devices, including wireless telephones, such as mobile/cellular telephones, cordless telephones, mp3 players, and other consumer audio devices, are in widespread use. Such personal audio devices may include circuitry for driving any suitable collection of electrical or electronic devices, including without limitation speakers, headphones, motors, haptic actuators, etc. Oftentimes, a power converter may be used to provide a regulated supply voltage to a power amplifier in order to amplify a signal driven to speakers, headphones, motors, haptic actuators, or other components. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier.

A predominant portion of the DC-DC converter circuit may be implemented within a single power management integrated circuit (PMIC) that provides a regulated supply voltage for a plurality of components, which themselves may be implemented as one or more other integrated circuits. The regulated supply voltage generated by the DC-DC converter may need to be large enough to satisfy voltage headroom requirements for all of the components powered from the regulated supply voltage. However, if the regulated supply voltage is too high and much greater than the required headroom, overall system efficiency may be compromised. Further complicating control of the regulated supply voltage is that each powered component may have a different voltage and/or headroom requirement, and routing impedances from the PMIC to the individual components may impose hard-to-predict voltage drops.

SUMMARY

In accordance with the teachings of the present disclosure, one or more disadvantages and problems associated with existing approaches to regulating an output voltage of a power converter distributed to multiple components may be reduced or eliminated.

In accordance with embodiments of the present disclosure, a system may include a first driver integrated circuit (IC) comprising a first driver powered from a supply voltage and configured to drive a first output signal responsive to a first input signal and a first error detector configured to generate a first error signal based between the supply voltage as detected locally to the first driver IC and a first reference voltage associated with the first driver. The system may also include a second driver IC comprising a second driver powered from the supply voltage and configured to drive a second output signal responsive to a second input signal and a second error detector configured to detect a second error signal between the supply voltage as detected locally to the second driver IC and a second reference voltage associated with the second driver. The system may further include a power management integrated circuit (PMIC) comprising circuitry configured to generate the supply voltage and a loop controller configured to receive the first error signal and the second error signal and regulate the supply voltage based on the first error signal and the second error signal.

In accordance with these and other embodiments of the present disclosure, a method may include generating a supply voltage with a power management integrated circuit (PMIC). The method may also include receiving, by a loop controller of the PMIC, a first error signal from a first driver integrated circuit (IC) having a first driver powered from the supply voltage and configured to drive a first output signal responsive to a first input signal and a first error detector configured to generate the first error signal based between the supply voltage as detected locally to the first driver IC and a first reference voltage associated with the first driver. The method may additionally include receiving, by the loop controller, a second error signal from a second driver IC comprising a second driver powered from the supply voltage and configured to drive a second output signal responsive to a second input signal and a second error detector configured to detect the second error signal between the supply voltage as detected locally to the second driver IC and a second reference voltage associated with the second driver. The method may further include regulating, by the loop controller, the supply voltage based on the first error signal and the second error signal.

In accordance with these and other embodiments of the present disclosure, a power management integrated circuit (PMIC) may include circuitry configured to generate a supply voltage and a loop controller configured to receive a first error signal from a first driver integrated circuit (IC) having a first driver powered from the supply voltage and configured to drive a first output signal responsive to a first input signal and a first error detector configured to generate the first error signal based between the supply voltage as detected locally to the first driver IC and a first reference voltage associated with the first driver, receive a second error signal from a second driver IC comprising a second driver powered from the supply voltage and configured to drive a second output signal responsive to a second input signal and a second error detector configured to detect the second error signal between the supply voltage as detected locally to the second driver IC and a second reference voltage associated with the second driver, and regulate the supply voltage based on the first error signal and the second error signal.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawing, in which like reference numbers indicate like features, and wherein:

THE FIGURE illustrates selected components of an example power management system, in accordance with embodiments of the present disclosure.

DETAILED DESCRIPTION

THE FIGURE illustrates selected components of an example power management system 10, in accordance with embodiments of the present disclosure. Example power management system 10 depicted in THE FIGURE may be used in connection with any suitable electronic and/or electrical system, including without limitation smartphones, game controllers, portable media players, digital cameras, etc.

As shown in THE FIGURE, power management system 10 may include a battery 22, a power inductor 32, a power management integrated circuit (PMIC) 20, and a plurality of driver integrated circuits (ICs) 50 (e.g., driver ICs 50A-50N).

Battery 22 may comprise a source of electric power comprising of one or more electrochemical cells with external connections for powering electrical devices by converting chemical energy into electrical energy. In some embodiments, battery 22 may comprise a rechargeable or secondary battery, capable of being recharged with chemical energy responsive to receipt of electrical energy. Power inductor 32 may comprise any suitable passive two-terminal electrical component that stores energy in a magnetic field when electric current flows through it.

As shown in THE FIGURE, PMIC 20 may include a switching network comprising charge switch 34, rectification switch 36, and a loop controller 40 configured to generate control signals P and $^-$P for charge switch 34 and rectification switch 36, respectively. Together, power inductor 32, charge switch 34, and rectification switch 36 may implement a power converter for converting a battery voltage $V_{BAT}$ generated by battery 22 to a supply voltage $V_{SUPPLY}$.

For purposes of exposition, power inductor 32, charge switch 34, and rectification switch 36 are arranged in THE FIGURE as a boost converter configured to boost battery voltage $V_{BAT}$ to supply voltage $V_{SUPPLY}$ greater than battery voltage $V_{BAT}$. However, in some embodiments, the power converter implemented by power inductor 32, charge switch 34, and rectification switch 36 may be arranged in any other suitable manner, and may include one or more other switches, to implement other functions (e.g., boost, buck-boost) other than a voltage boosting function. Further, although an inductive-based power converter is depicted in THE FIGURE, in some embodiments another switch-based DC-to-DC converter architecture may be used, such as a capacitive-based charge pump.

In operation, loop controller 40 may periodically commutate charge switch 34 (e.g., during a charging state of the power converter) and rectification switch 36 (e.g., during a transfer state of the power converter) by generating appropriate control signals P and $^-$P to convert battery voltage $V_{BAT}$ to supply voltage $V_{SUPPLY}$ in order to regulate supply voltage $V_{SUPPLY}$ above threshold minimum voltages for each of driver ICs 50. To that end, loop controller 40 may include an error controller 42, configured to receive error signals (e.g., ERR1, . . . , ERRN) from each of driver ICs 50, wherein an error signal for a driver IC 50 is indicative of whether supply voltage $V_{SUPPLY}$ (as sensed locally to the driver IC 50 in order to account for routing losses) is above a reference voltage $V_{REF}$ for such driver IC 50, wherein such reference voltage $V_{REF}$ for such driver IC 50 may be indicative of a minimum supply voltage (including an adequate supply voltage headroom to prevent signal clipping or other artifacts) for such driver IC 50. Error controller 42 may further be able to logically combine the error signals and based on such combination, generate control signals P and $-$P in order to increase or decrease supply voltage $V_{SUPPLY}$ in order to maintain supply voltage $V_{SUPPLY}$ at a minimum level necessary to satisfy the minimum supply voltage requirements of all of driver ICs 50. For example, if all of the error signals indicate that the locally-sensed supply voltage $V_{SUPPLY}$ at all driver ICs 50 is above the respective reference voltages $V_{REF}$ for all driver ICs 50, loop controller 40 may cause control signals P and $^-$P to decrease supply voltage $V_{SUPPLY}$. On the other hand, if one (or more) of the error signals indicate that the locally-sensed supply voltage $V_{SUPPLY}$ at a driver IC 50 is below the respective reference voltage $V_{REF}$ for such driver IC 50, loop controller 40 may cause control signals P and $^-$P to increase supply voltage $V_{SUPPLY}$. Further, in cases in which the error is zero, loop controller 40 may ensure that the control loop does not become or does not act like an open loop.

As shown in THE FIGURE, each driver IC 50 may include a respective amplifier 52 (e.g., amplifiers 52A-52N) or other driving circuit powered by supply voltage $V_{SUPPLY}$ and configured to amplify, attenuate, or buffer a respective input signal $V_N$ to generate a respective output signal $V_{OUT}$. As also shown in THE FIGURE, each driver IC 50 may include a respective comparator 54 (e.g., comparators 54A-54N) or other error detection circuitry to detect a difference between supply voltage $V_{SUPPLY}$ (as sensed locally to the driver IC 50 in order to account for routing losses) and reference voltage $V_{REF}$ for such driver IC 50, and generate an error signal ERR based on such difference. Further, when supply voltage $V_{SUPPLY}$ is greater than reference voltage $V_{REF}$, error signal ERR may be zero, meaning that supply voltage $V_{SUPPLY}$ is sufficient for such driver IC 50.

For example, in the implementations represented by THE FIGURE, an error signal ERR may be a binary signal indicating whether supply voltage $V_{SUPPLY}$ is greater than the respective reference voltage $V_{REF}$ for such driver IC 50. However, in other embodiments, error detection circuitry may be more robust and be capable of generating error signal ERR indicative of a magnitude of difference between supply voltage $V_{SUPPLY}$ (as sensed locally to the driver IC 50 in order to account for routing losses) and reference voltage $V_{REF}$ for such driver IC 50.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
a first driver integrated circuit (IC) comprising:
    a first driver powered from a supply voltage and configured to drive a first output signal responsive to a first input signal; and
    a first error detector configured to generate a first error signal based between the supply voltage as detected locally to the first driver IC and a first reference voltage associated with the first driver;
a second driver IC comprising:
    a second driver powered from the supply voltage and configured to drive a second output signal responsive to a second input signal; and
    a second error detector configured to detect a second error signal between the supply voltage as detected locally to the second driver IC and a second reference voltage associated with the second driver; and
a power management integrated circuit (PMIC) comprising:
    circuitry configured to generate the supply voltage; and
    a loop controller configured to:
        receive the first error signal and the second error signal; and
        regulate the supply voltage based on the first error signal and the second error signal.

2. The system of claim 1, wherein the circuitry configured to generate the supply voltage comprises a switched-based power converter.

3. The system of claim 1, wherein the loop controller is further configured to continuously regulate the supply voltage based on the first error signal and the second error signal.

4. A method comprising:
generating a supply voltage with a power management integrated circuit (PMIC);
receiving, by a loop controller of the PMIC, a first error signal from a first driver integrated circuit (IC) having a first driver powered from the supply voltage and configured to drive a first output signal responsive to a first input signal and a first error detector configured to generate the first error signal based between the supply voltage as detected locally to the first driver IC and a first reference voltage associated with the first driver;
receiving, by the loop controller, a second error signal from a second driver IC comprising a second driver powered from the supply voltage and configured to drive a second output signal responsive to a second input signal and a second error detector configured to detect the second error signal between the supply voltage as detected locally to the second driver IC and a second reference voltage associated with the second driver; and
regulating, by the loop controller, the supply voltage based on the first error signal and the second error signal.

5. The method of claim 4, wherein generating the supply voltage comprises generating the supply voltage using a switched-based power converter.

6. The method of claim 4, wherein regulating, by the loop controller, the supply voltage based on the first error signal and the second error signal comprises continuous regulation.

7. A power management integrated circuit (PMIC) comprising:
circuitry configured to generate a supply voltage; and
a loop controller configured to:
    receive a first error signal from a first driver integrated circuit (IC) having a first driver powered from the supply voltage and configured to drive a first output signal responsive to a first input signal and a first error detector configured to generate the first error signal based between the supply voltage as detected locally to the first driver IC and a first reference voltage associated with the first driver;

receive a second error signal from a second driver IC comprising a second driver powered from the supply voltage and configured to drive a second output signal responsive to a second input signal and a second error detector configured to detect the second error signal between the supply voltage as detected locally to the second driver IC and a second reference voltage associated with the second driver; and regulate the supply voltage based on the first error signal and the second error signal.

8. The PMIC of claim 7, wherein the circuitry configured to generate the supply voltage comprises a switched-based power converter.

9. The PMIC of claim 7, wherein the loop controller is further configured to continuously regulate the supply voltage based on the first error signal and the second error signal.

<center>*  *  *  *  *</center>